United States Patent [19]

Glover et al.

[11] Patent Number: 4,841,771
[45] Date of Patent: Jun. 27, 1989

[54] FUEL LEVEL SENSOR

[75] Inventors: Alfred H. Glover, Decatur; Daniel F. Lawless, Hazel Green, both of Ala.

[73] Assignee: Chrysler Motors Corporation, Highland Park, Mich.

[21] Appl. No.: 216,568

[22] Filed: Jul. 8, 1988

[51] Int. Cl.$^4$ .............................................. G01F 23/32
[52] U.S. Cl. ........................................ 73/317; 73/305; 73/313; 403/106; 403/361
[58] Field of Search ................. 73/317, 1 H, 313, 305; 403/104, 106, 105, 361

[56] References Cited

U.S. PATENT DOCUMENTS

| | | | |
|---|---|---|---|
| 896,706 | 8/1908 | Brent | 73/317 |
| 903,212 | 11/1908 | Martin . | |
| 1,922,362 | 6/1931 | Halversen | 73/317 |
| 2,314,158 | 3/1942 | Peters | 73/317 |
| 2,322,947 | 5/1942 | Litwin et al. | 403/361 |
| 2,467,842 | 6/1945 | Marx | 403/105 |
| 2,529,219 | 8/1945 | Kost | 403/361 |
| 2,590,937 | 11/1957 | Bedford | 403/361 |
| 2,713,264 | 10/1951 | Howell | 73/317 |
| 3,130,990 | 9/1961 | Leitmann | 403/361 |
| 4,114,130 | 9/1978 | Sutton et al. . | |
| 4,184,370 | 1/1980 | Schlick et al. | 73/313 |
| 4,532,491 | 6/1985 | Rau et al. | 73/317 |
| 4,557,144 | 12/1985 | Lucchini . | |
| 4,706,707 | 11/1987 | Betterton et al. . | |

Primary Examiner—William A. Cuchlinski, Jr.
Assistant Examiner—Diego F. F. Gutierrez
Attorney, Agent, or Firm—Kenneth H. Maclean, Jr.

[57] ABSTRACT

A vehicle fuel tank with a fuel level sensor is disclosed including a housing rotatably supporting a molded crank arm and a pivotal float rod attached thereto. The crank arm has a bore for insertion of one end of the crank arm and an apertured metal insert molded therein for providing a gripping interference fit between the inserted rod and the crank arm.

2 Claims, 3 Drawing Sheets

FUEL LEVEL SENSOR

BACKGROUND OF THE INVENTION

In automotive fuel tanks, it is common practice to utilize a fuel pick-up device with or without an intake fuel pump and also supporting a fuel level indicating mechanism. The fuel indicating mechanism typically has an elongated rod with a free end supporting a float which moves along with changes in fuel levels. The other end of the rod is pivotally mounted to an indicating or sensor mechanism. The indicating mechanism typically includes an elongated electrical resistance grid and a contact pad which moves with movements of the float and rod as the fuel level changes. The movement of the contact pad along the resistance grid changes electrical characteristics of a circuit thus providing a variable input to a fuel indicator gauge located within the passenger compartment of the associated vehicle.

The aforedescribed fuel indicators or sensors within the fuel tank are generally known. An example of such an indicator is found in U.S. Pat. No. 4,114,130 which discloses the aforementioned pivotal rod, and elongated resistance grid, and a contact pad moveable along the resistance grid corresponding to fuel level changes. In this patent, the contact pad is supported by a member fastened to a portion of the float carrying rod.

An early fluid level gauge is disclosed in U.S. Pat. No. 903,212 which utilizes a pivotally mounted rod carrying a float at one end. In this patent, the float rod extends directly into a fluid level indicating gauge. Thus the aforementioned elongated electrical resistance grid and contact pad are not utilized. Of course, a remote indication of the fluid level in the tank is not anticipated with this arrangement.

Another level sensor or indicator is disclosed in U.S. Pat. No. 4,557,144. In this patent, a float is supported by a pivotal rod which extends into a sensor or indicating assembly. An arm attached to the rod supports a contact moveable along a resistance grid. A spring clip arrangement is utilized between the housing and the contact bearing arm so that axial deviations are eliminated thus maintaining good electrical contact.

The aforementioned patents all utilize a float supported by a pivotal rod for following changes in liquid levels within the fuel tank. However, in these patents there is no accurate and convenient manner of adjusting the angular relationship between a float carrying rod and the position of a contact bearing member relative to an elongated grid. This relationship is important for calibration of the indicating mechanism and to produce a desired output corresponding to both low fuel levels and a high fuel levels. It is particularly desirable to provide a means to calibrate the mechanism after assembly to produce a desired output corresponding to a predetermined position of the float and rod.

SUMMARY OF THE INVENTION

In this application, a fuel level sensor suitable for use in an automobile is disclosed. The sensor utilizes a float which responds to fuel level changes in the tank. A rod supports the float at a free end. The rod extends into a sensor housing in which a contact member moveable along an elongated resistance grid is located. Specifically, the contact is supported by a molded crank arm member having an axial bore which receives the end of the rod.

The crank arm member is molded about a substantially flat metal insert. The insert has a central aperture struckout therethrough leaving an opening surrounded by a generally conically directed edge portion. In assembly, the end of the rod is inserted into the crank arm bore and through the aperture in the insert which causes the edge portion to be distorted radially outwardly. By this means, a secure gripping relationship is formed between end of the float rod and the crank arm member. Also, it is possible to hold the float rod stationary and pivot the crank arm for the purpose of changing the relative position therebetween. This is useful in calibrating the device so that an accurate predetermined output is produced corresponding to various fuel levels in the fuel tank. Previously, such a calibration procedure has been involved the bending of tabs on the sensor housing which position the rod. Obviously, setting of tabs is much less accurate and convenient than the changing of the angular position between the rod and the crank arm as in the subject invention.

Therefore, an object of the invention and an advantageous feature is the utilization of a contact carrying crank arm member including an insert which is molded therein so that an end of a float rod may be inserted therein to establish a good gripping relationship between the rod and the crank arm member which impedes removal and changes in relative angular positions therebetween.

A further object and advantageous feature is the provision of a molded crank arm with a metal insert member therein, the metal insert having a struck-out aperture therethrough encircled by a conical edge portion so that insertion of the float rod through the insert member distorts the edge portion outward and provides a good gripping relationship therebetween.

Other objects and advantageous features of the subject invention will be more readily apparent from a reading of the detailed description, reference being had to the drawings which illustrate a preferred embodiment of the invention.

IN THE DRAWINGS

FIG. 1 is an elevational and partially sectioned view of a fuel delivery apparatus which includes the subject fuel level sensor showing the view showing the relationship of the sensor to the walls of a fuel tank; and FIG. 1A is a fragmentary and partially sectioned view of a further portion of the fuel delivery assembly shown in FIG. 1; and FIG. 2 is a side elevational view of the fuel level sensor shown in FIG. 1 and looking in the direction of arrow A; and FIG. 3 is an enlarged elevational view of the fuel level sensor shown in FIG. 1 and partially broken away to reveal interior features thereof; and FIG. 4 is a view similar to FIG. 3 but looking from the opposite side thereof; and FIG. 4A is an enlarged fragmentary view of the elongated member and the resistance grid shown in FIG. 4; and FIG. 5 is a side elevational view of the contact carrying crank arm shown in FIGS. 3 and 4; and FIG. 6 is an end elevational view of the crank arm shown in FIG. 5; and FIG. 7 is a view similar to FIG. 6 but solely of the crank arm without the contact assembly; and FIG. 8 is a fragmentary sectioned view of the crank arm taken along section line 8—8 in FIG. 7 and looking in the direction of the arrows; and FIG. 9 is a partial end elevational view of the crank arm similar to FIG. 7 but looking in an opposite direction and revealing the opposite end thereof.

DETAILED DESCRIPTION OF A PREFERRED EMBODIMENT

Figure 1:
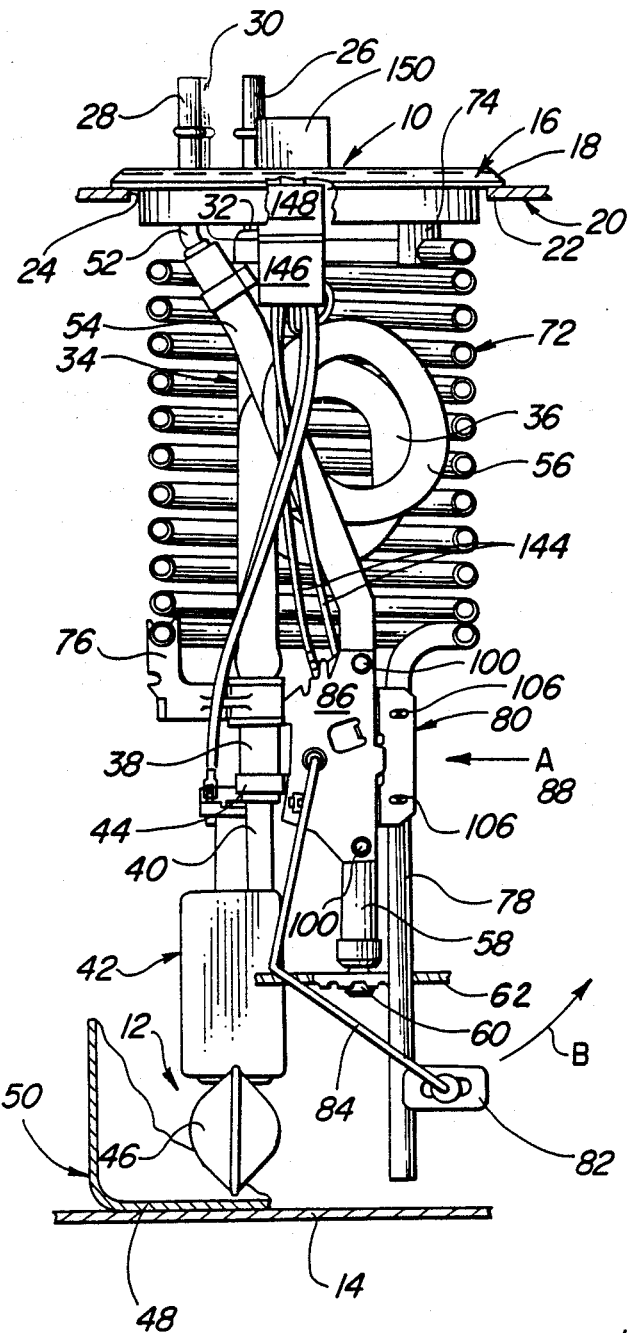

A fuel delivery assembly 10 for an automobile fuel tank is illustrated in FIG. 1. Assembly 10 includes an enclosure portion 12 which is positioned within a vehicle fuel tank and just above a bottom wall 14 thereof. The fuel delivery assembly 10 also includes an upper cover or support member 16 having a peripheral edge portion 18. Specifically, edge portion 18 engages an edge 22 of the top wall 20 of the fuel tank. The edge 22 encircles an opening 24 to the interior of the fuel tank. Opening 24 is sized to permit the assembly 10 to be inserted into the interior of the fuel tank.

The support member 16 has three tubular fittings 26, 28 and 30 which extend through member 16 and are for the purpose of conducting fuel flow through member 16. Specifically, fitting 26 is a fuel outlet fitting for passing fuel from the fuel tank to an associated engine. It includes portion 32 in the fuel tank and extending below support member 16. Portion 32 is attached to an upper end of an elastomeric hose member 34 which extends downward from member 16. Hose 34 is formed into a loop portion 36 a mid-portion. Below the loop portion 36, the hose 34 is attached to outlet fitting 40 of a liquid fuel pump assembly 42. A clamping ring 44 makes this connection substantially leak resistant. The fuel pump 42 receives fuel from the fuel tank through a lower inlet (not visible). Specifically, the inlet is within the interior of a filter assembly 46. The filter 46 is a conventional design utilized in automotive fuel tanks and typically is made of meshed material such as nylon. The filter prevents particles within the tank from entering the fuel pump.

The inlet of the fuel pump 42 and its filter 46 are positioned adjacent to the bottom wall 48 of a hollow reservoir assembly 50. Only part of reservoir 50 is shown in FIG. 1 so that other portions of the fuel delivery assembly are visible. For more details of a suitable reservoir, reference is hereby made to U.S. Pat. No. 4,706,707 which is assigned to Chrysler Motors Corporation. The reservoir 50 is a cup shaped container with an open top. The reservoir permits fuel to be gathered about the fuel pump inlet and its filter member 46 at an enhanced fluid level relative to a near empty fuel tank. The reservoir and the means of filling it with fuel is explained in the above identified patent. In summary, the level of fuel within the reservoir is maintained by pumping excess fuel not needed by engine operation back into the reservoir through an aperture in the lower part of the reservoir. The stream of the return fuel tends to draw in additional quantities of fuel from the fuel tank into the reservoir.

The aforedescribed filling of the reservoir by excess fuel is accommodated by flow of fuel through the fitting 28 which extend through support member 16 and has a lower portion 52 located beneath member 16. Portion 52 is attached to an upper end of an elastomeric hose 54 which then extends downward from member 16. A looped portion 56 of hose 54 is formed at its mid-portion. The looped portions 36 and 56 of hoses 34, 54 permit the fuel delivery assembly to vary in length or in the direction between the bottom and top walls 14 and 20 of the fuel tank. This accommodates dimensional differences in fuel tanks. The lower end 58 of the hose 54 is attached to fitting 60 which extends through an aperture in wall 62 of the reservoir assembly 50.

Figure 1A:
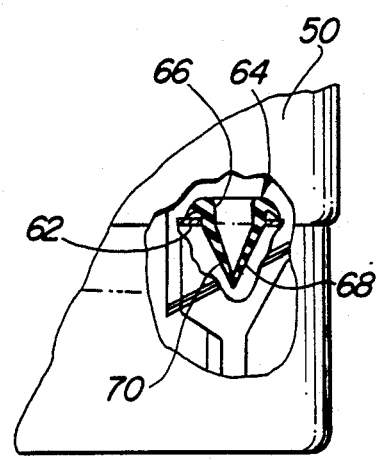

Specifically as best shown in FIG. 1a, wall 62 of reservoir 50 supports a unidirectional flow check valve assembly 64. Assembly 64 has a central passage 66 and a pair of flexible lower end portions 68 and 70 which normally are resiliently biased toward one another to prevent upward flow through assembly 64. The check valve assembly relies on the molded resilient properties of the elastomeric or rubber material to prevent flow in the upward direction. However, the portions 68 and 70 freely move apart to permit downward flow through assembly 64. The aforedescribed flow from fitting 28 to and through check valve 64 corresponds to the return flow of excess fuel originally pumped through fitting 26 to the engine.

Obviously, a fuel pump is selected with a greater pumping capacity than the engine normally needs for operation. Thus when the engine is operated at other than wide open throttle conditions, there is an excess fuel pumped to the engine which must be returned through the check valve 64. From check valve 64 a stream of fuel is directed through an opening in the lower wall of the fuel collector 50 which is also located near the bottom wall 14 of the fuel tank. The stream of fuel through this opening tends to induce additional fuel from the interior of the fuel tank into the collector assembly 50. By this means, the fuel level is enhanced in reservoir 50. This is perhaps best explained in the above identified patent and reference is hereby made for a more complete explanation.

A third fitting 30 is supported by the support member 16 and is partially shown in FIG. 1 but is mostly located behind fitting 28. Fitting 30 extends through the support 16 and has a lower portion attached to an upper end of a helically configured tube structure 72 as (shown in crosssection in FIG. 1.). The tubing 72 is further supported at its upper end portion by a depending leg 74 of the member 16. The tubing 72 includes a lower open ended portion 78 which extends vertically downward and ends slightly above the bottom wall 14. Fitting 30 and the tubing 72 may be utilized to evacuate the fuel tank.

This downwardly extending portion 78 supports the subject level sensing device 80. The device 80 includes a float member 82 which follows liquid fuel changes in the tank. The float member 82 is attached to a free end of a float rod 84. In FIG. 1, float 82 is shown at a low position in the fuel tank indicating a near empty condition. The rod 84 extends from the float 82 and then turns at an upper end portion to extend through a base plate 86 of sensor 80 as best shown in FIG. 1.

Figure 2:
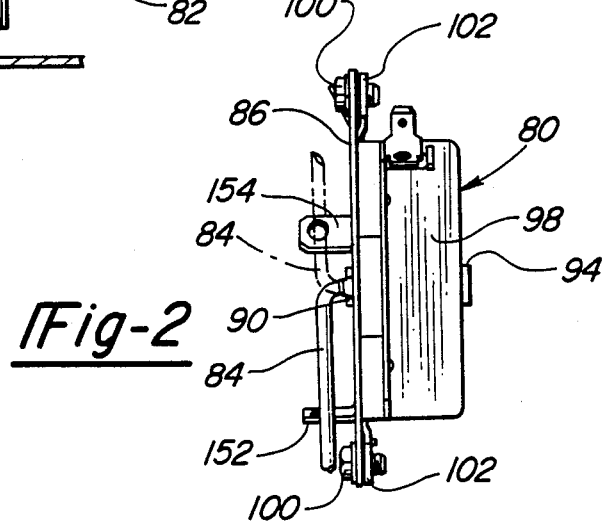
Figure 3:
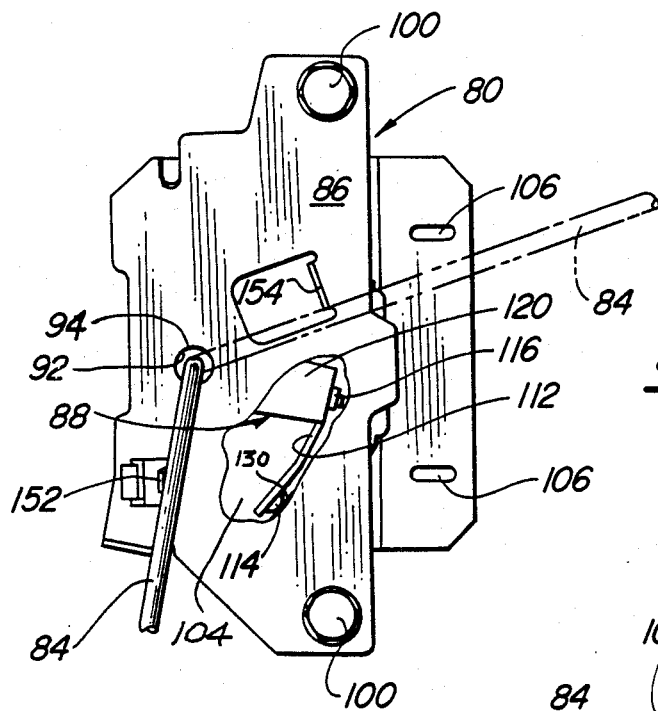
Figure 4A:
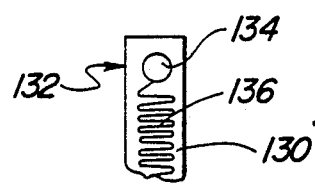
Figure 4:
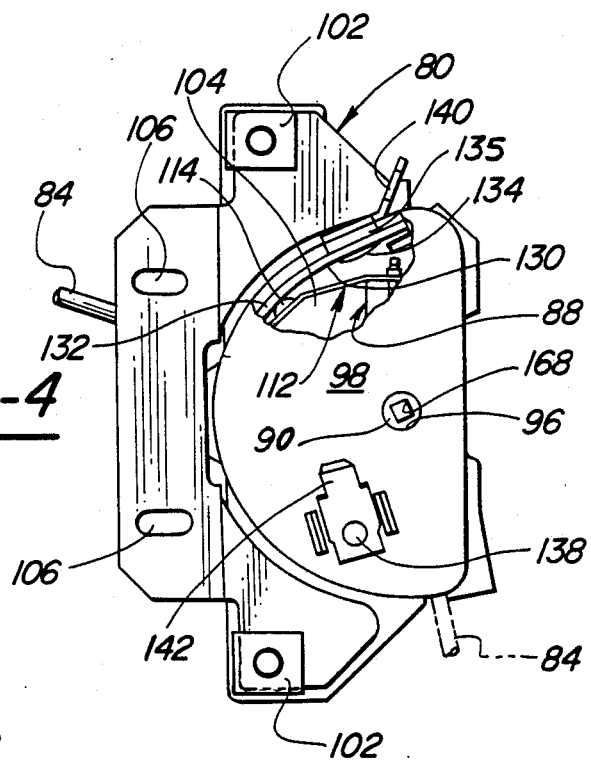

As seen through broken away portions in FIGS. 3 and 4, a molded crank arm member 88 is positioned within the interior of the sensor 80. The crank arm 88 is molded of elastomeric material and is operably connected to the float rod 84 as later explained hereinafter. The specific construction of the crank arm 88 is best understood by reference to FIGS. 5–9. Crank arm 88 includes a stepped cylindrical base defining a smaller diameter end portion 90 which is adapted to extend through an aperture 92 in plate member 86 as shown in FIG. 3. An opposite end portion 94 of the crank arm 88 likewise extends through an aperture 96 in a metal enclosure member 98 which forms part of the device 80 as shown in FIG. 4. The member 86 and enclosure member 98 define the interior of the sensor 80 in which the crank arm 88 is mounted. The enclosure 98 is generally cup shaped and attached to the plate member 86 by fasteners including cap screws 100 shown in FIG. 2 and 3. Each cap screw 100 is threaded into an overlying insert member 102 to thereby secure the members 86 and 98 together.

Figure 8:
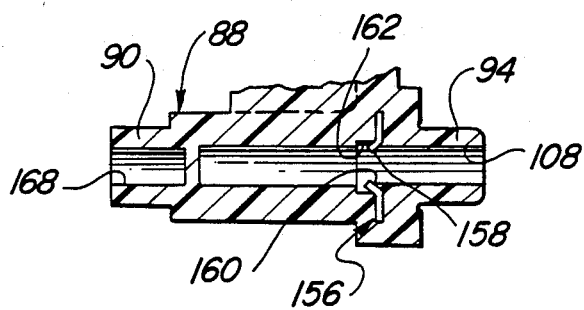

The sensor 80 is attached to the portion 78 of assembly 10 by soldering or the like at locations indicated by numerals 106. As shown in FIG. 1, float rod 84 is rotated in direction B as the fuel level increases. This motion of rod 84 is transferred to the operatively connected crank arm 88. As shown in FIG. 8, crank arm 88 has an axially extending bore 108 formed therein which extends about three-fourths of the axial length of the crank arm. The Upper end of rod 84 extends into this bore 108 to cause the rod 84 and crank arm 88 to rotate together with changes in the fuel level.

Figure 5:
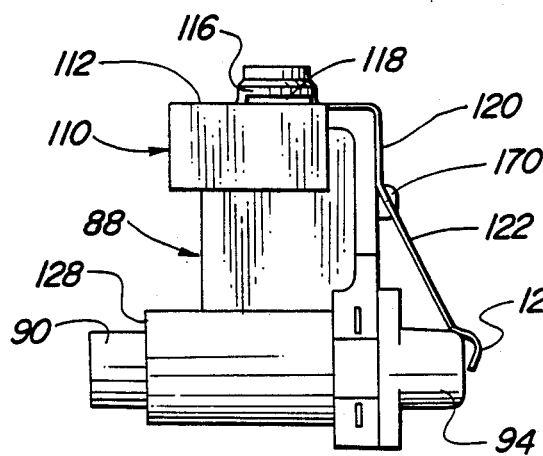
Figure 6:
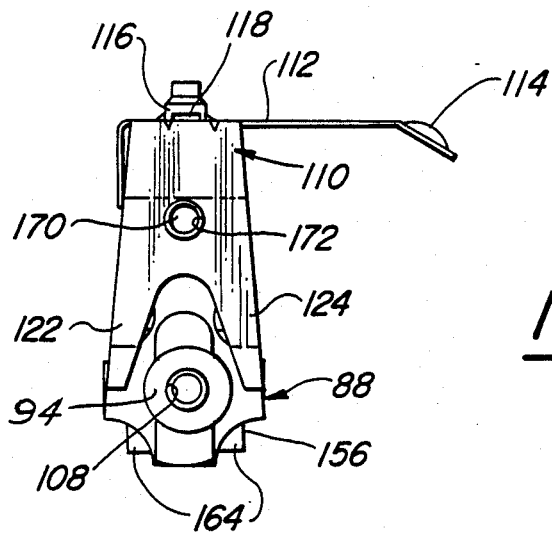

Referring to FIGS. 5 and 6, crank arm 88 supports a metal contact carrying member 110 which has an elongated arm 112 extending therefrom. The arm which supports a contact pad 114 at an end portion thereof. The member 110 is attached to crank arm 88 by a generally rectangularly shaped aperture which is adapted to engage sidewalls of a correspondingly shaped boss portion 116 on the crank 88. The rectangularly configured aperture in member 110 includes struck-out edge portions 118 which tend to grip the sidewalls of boss 116 thereby securing member 110 to the crank arm 88.

As shown in FIG. 5, member 110 includes a side wall 120 which extends first extends in overlying relation to an upper portion of the crank arm 88. The wall 120 then extends axially outward relative. The lower portion of wall 120 is separated into portions 122 and 124. Each portion 122, 124 has curved ends 126. The curved ends 126 are adapted to press against the inner surface of the plate member 86 when the crank arm 88 is in an assembled portion between the members 86 and 98. The ends 126 of the arm portions 122, 124 press the crank arm assembly 88 so that shoulder portion 128 is maintained against the plate member 86. This inhibits movement of the crank arm 88 between the member 88 and enclosure 98.

Referring specifically to FIGS. 3 and 4, portions of the contact arm 88 and the contact carrying member 112 thereof are visible within the interior 104 of sensor 80. Rotation of the rod 84 produces corresponding rotation of the crank arm 88 within the interior 104. Resultantly, arm 112 and the contact pad 114 there are moved along a surface 130. Surface 130 is on an arcuately shaped resistor board 132. The resistor board 132 is supported by enclosure member 98 at an upper end by a rivet fastener 134. The fastener 134 extends through the wall of the enclosure member 98 and also through an insulative spacer member 135. This electrically insulates rivet 134 from enclosure member 98 and base member 86.

As illustrated in FIG. 4A, the resistor board 132 carries an elongated resistance grid 136 on surface 130. The upper end of the resistance grid 136 is connected to the rivet 134. A second rivet fastener 138 extends through the enclosure member 98 for attaching a terminal member 142 to the exterior side thereof as shown in FIG. 4. Likewise, a similar terminal member 140 is attached on the exterior of member 98 by the first rivet 134. Terminal 142 is connected in circuit with the metallic member 98 by the rivet 138 and hence to the metallic member 86. Thus, it can be understood that terminal 142 is electrically connected by members 98, 86 and by the curved end portions 126 of the contact bearing member 110. In this manner, the contact pad 114 is electrically connected to terminal 142. Terminals 140 and 142 are adapted to be attached to separate wires 144 shown in FIG. 1. Wires 144 are attached to a connector block 146 which is adapted to be plugged into a corresponding connector block 148 supported on the under side of support 16. The connector 148 includes terminals (not visible) which extend through the support 16 but are insulated therefrom. These terminals extend upwardly into an open ended receptacle 150 extending from the upper surface of member 16. The receptacle 150 encircles the terminals and is adapted to receive a plug member (not shown) to electrically connect terminals 140 and 142 of sensor 80 to an associated vehicle level indicating circuit and gauge.

Referring again to FIG. 3, the solid line position of rod 84 indicates a near empty fuel tank. Pad 114 is positioned relatively far from rivet which is shown in FIG. 4A near the top of board 132. Accordingly, the circuit of the sensor extends practically through the full length of the resistance grid 136. As the fuel level in the tank increases the rod 84 rotates counter-clockwise in FIG. 3 toward the broken line position 84. This also produces counter-clockwise rotation of crank arm 88 and causes contact pad 114 to move along the elongated resistance grid 136 toward rivet 134. This changes the sensor's esistance characteristics by progressively eliminating portions of the resistance grid 136. Accordingly, the electrical sensor resistance decreases corresponding to increases in the fuel level.

Referring to FIG. 4, it can be seen that the solid line position of rod 84 corresponds to a nearly full fuel tank. The contact 114 is positioned near the upper end of the resistance grid 136 effectively eliminating most of the grid from the sensor circuit. This decreases the sensor resistance.

Referring again to FIG. 3, it can be seen that plate member 86 provides two stop means which limit rotative travel of rod 84. Specifically a lower limit of rotation is defined by an outwardly projecting tab 152. Likewise, an upper limit of rotation is defined by an outwardly extending tab 154.

Figure 7:
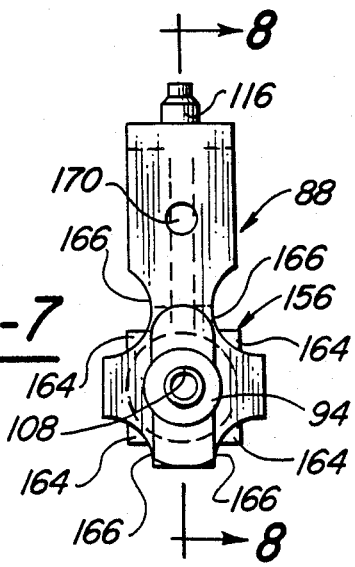
Figure 9:
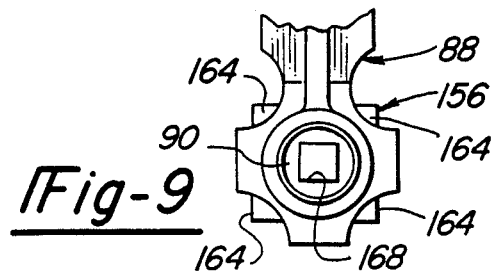

As previously mentioned, it is necessary to connect rod 84 and crank arm 88 in a simple but solidly gripping manner. Accordingly, crank arm 88 is provided with the aperture or bore 108 to receive a substantial length of the upper portion of rod 84. The crank arm 88 is mold formed of relatively rigid and durable elastomeric material. As best shown in FIGS. 7-9, a metal insert 156 is molded within the crank arm 88. The insert 156 is a substantially flat sheet metal member having a generally rectangular configuration. Insert 156 has a central aperture 158 therethrough which is coaxial with bore 108. Aperture 158 is formed in the metal insert 156 by striking out a circular portion of the metal and simultaneously forming an edge portion 160 which extends radially inwardly and axially away from end 94 as shown if FIG. 8. The aperture 158 is of a slightly smaller diameter than the associated rod 84. The rod 84 is inserted into the bore 108 and moved through the insert 156. this causes the edge portion to distort or flex radially outwardly to allow permit passage of the rod 84. Because of the configuration and orientation of edge portion 160, it is relatively easy to insert rod 84 into bore 108 to the left through the insert 156. Likewise, it is difficult to move the rod 84 out of the bore 108 to the right once it is inserted through the aperture of the insert. The insert grippingly engages the rod and secures it to the crank arm. The gripping action produced by the flexing of edge portion 160 is sufficient to maintain a set angular relationship between the rod 84 and crank arm 88.

In the FIG. 8, an annular undercut channel portion 162 has been formed within the bore 108 and adjacent the edge portion 160. This undercut channel 162 may be utilized to facilitate necessary outward expansion of the edge portion 160 caused by the insertion of rod 84 through the insert 156. This channel 162 may be unnecessary if the aperture 158 is only slightly smaller than the diameter of rod 84. However, if greater flexing of the edge portion 160 is desired, the undercut channel 162 may be provided.

As previously explained, insert 156 has a generally rectangular configuration. This configuration permits molding the crank arm 88 and orienting the aperture 158 coaxially with the bore 108. It can be understood that the exposed corners 164 of the insert 156 extend outwardly from a generally cylindrical portion. The mold is configured to form curved recesses or clearances 166 adjacent end 94 of the crank arm 88. The provisions of corners 164 and recesses 166 permit the insert 156 to be accurately positioned in the mold.

As previously mentioned, calibration of prior art sensors has been awkward. The subject sensor provides a means for simply calibrating the sensor. This method is directly related to the described gripping relationship formed between the rod 84 and crank arm 88 due to the fixed edges 160 of the insert 156. As shown in FIGS. 4, 8 and 9, the end 90 of crank arm 88 has a noncircular socket or recess 168 molded therein. In this particular embodiment, socket 168 is in the form of a square aperture. However, a hexagonal or other noncircular socket would also serve. By connecting the sensor to an electrical circuit and positioning of rod 84 in the lowest or downward position against tab 152, the sensor output or electrical resistance through the resistance grid 136 can be indicated and read. If the indicated resistance is not as predetermined, a tool in the form of a crank is adapted to engage socket 168 and the crank arm 88 is rotated as the rod 84 is held against the tab 152. When a desired electrical resistance is established, the tool is removed from socket 168 and the previously described gripping relationship betwen the rod and crank arm secures the rod and arm together thereafter during the useful life of the device.

A final desirable structural feature of the device is perhaps best shown in FIGS. 5, 6 and 7. The crank arm 88 has an outwardly extending knob 170 formed on its side wall adjacent the cylindrical end 94 thereof. The knob 170 is for the purpose of receiving a slightly larger diameter aperture 172 formed in side wall 120 of the contact bearing member 110. This interfitting relationship maintains the member 110 squarely on upper portion of the contact member 88.

Although only a single embodiment of the subject fuel level sensor utilizing a molded crank arm and included metal insert has been described in detail, it should be readily apparent that modifications may be made to this embodiment that still fall within the scope of the following claims which define the invention.

I claim:

1. A fuel level sensor adapted for support within the interior of a fuel tank, comprising: a sensor housing; a float rod housing an end portion pivotally supported relative to the sensor housing, the end portion having a given diameter; a crank arm of molded elastic material having opposite cylindrical end portions; the sensor housing having opposite spaced walls with apertures therein for receiving the end portions of the crank arm thereby supporting the crank arm for rotation within the sensor housing; an axially extending bore in the crank arm and through one of the end portions thereof adapted to receive the end portion of the float rod thereby operably connecting the float rod and the crank arm; a metal insert member molded within the crank arm normal to the axial extent of the bore in the crank arm; an aperture through the metal insert member being coaxial with the bore and having a diameter slightly smaller than the given diameter of the float rod end portion; an edge portion of the insert about the aperture being formed to permit easy insertion of the float rod into the bore of the crank arm while resisting withdrawal of the rod in the opposite direction and providing a sufficient gripping force between the crank arm and the rod to maintain the angular relationship between the crank arm and rod constant; the fuel level sensor is which the crank arm has a noncircular socket formed in an end opposite the one end through which the bore is formed, the noncircular socket permitting the crank arm to be rotated relative to the rod for calibration after the float rod end portion is insertably attached to the crank arm.

2. In a combination with a vehicle fuel delivery assembly including a depending member extending through the exterior of the vehicle fuel tank, an improved fuel level sensor attached to the depending member, comprising: a sensor housing; a float rod having a cylindrical end portion pivotally supported relative to the sensor housing; the housing including spaced walls with aligned apertures in the walls; a crank arm member of molded elastomeric material having a generally cylindrical portion with reduced diameter opposite ends for extending into the aligned apertures of the housing walls thereby supporting the crank for rotation in the housing; one of the opposite ends of the crank arm member having an axially extending bore therein adapted to have the float rod inserted therein; a generally flat metal insert member molded within the crank arm and extending in a plane generally normal to the axially extending bore of the crank arm; an aperture through the insert member positioned coaxially with the bore of the crank arm, the aperture having a slightly smaller diameter than the cylindrical portion of the float rod but allowing insertion of the rod through the aperture and providing good gripping between the crank arm and the rod to resist changes in relative angular positions without application of a significant torque force between the crank arm and the float rod; the fuel level sensor in which the crank arm has a noncircular socket formed in an end opposite the end through which the bore extends, the noncircular socket permitting access for application of a significant torque force on the crank arm and its included metal insert to produce relative rotation between the crank arm and fixed float rod for calibration purposes.

* * * * *